US008600873B2

(12) United States Patent
Fisher

(10) Patent No.: US 8,600,873 B2
(45) Date of Patent: Dec. 3, 2013

(54) MANAGED REAL-TIME TRANSACTION FRAUD ANALYSIS AND DECISIONING

(75) Inventor: Richard Fisher, Monument, CO (US)

(73) Assignee: Visa International Service Association, San Francisco, CA (US)

( * ) Notice: Subject to any disclaimer, the term of this patent is extended or adjusted under 35 U.S.C. 154(b) by 648 days.

(21) Appl. No.: 12/549,314

(22) Filed: Aug. 27, 2009

(65) Prior Publication Data

US 2010/0305993 A1 Dec. 2, 2010

Related U.S. Application Data

(60) Provisional application No. 61/182,019, filed on May 28, 2009.

(51) Int. Cl.
G06Q 40/00 (2012.01)
(52) U.S. Cl.
USPC .............................. 705/38; 705/35
(58) Field of Classification Search
USPC ....................................... 705/38, 35
See application file for complete search history.

(56) References Cited

U.S. PATENT DOCUMENTS

| | | | |
|---|---|---|---|
| 5,819,226 A | 10/1998 | Gopinathan et al. | |
| 5,991,750 A | 11/1999 | Watson | |
| 6,119,103 A | 9/2000 | Basch et al. | |
| 6,594,647 B1 | 7/2003 | Randle et al. | |
| 6,714,918 B2 | 3/2004 | Hillmer et al. | |
| 7,021,532 B2 | 4/2006 | Robinson et al. | |
| 7,231,657 B2 | 6/2007 | Honarvar et al. | |
| 7,248,855 B2 | 7/2007 | Joyce et al. | |
| 7,263,506 B2 | 8/2007 | Lee et al. | |
| 7,353,214 B2 | 4/2008 | Yamanishi et al. | |
| 7,403,922 B1 | 7/2008 | Lewis et al. | |
| 7,527,195 B2 | 5/2009 | Keithley et al. | |
| 7,657,497 B2 | 2/2010 | Nandy | |
| 2002/0099649 A1* | 7/2002 | Lee et al. ................... | 705/38 |
| 2002/0120559 A1* | 8/2002 | O'Mara et al. ............. | 705/38 |

(Continued)

FOREIGN PATENT DOCUMENTS

EP 0669032 B1 11/1997

OTHER PUBLICATIONS

MacVittie, Lori; "Online fraud detection takes diligence"; Networking Computing; Feb. 18, 2002.*

(Continued)

*Primary Examiner* — Edward Chang
(74) *Attorney, Agent, or Firm* — Kilpatrick Townsend & Stockton LLP

(57) ABSTRACT

A system, apparatus, and method for providing real-time or pseudo real-time processing of transactions for a set of clients using a common or partially common rule base. Each client is assigned to a tier or category with the tier or category defined by specified performance criteria. In some embodiments, the specified performance criteria includes a false positive ratio (FPR). A rule for processing transactions is defined as a combination of an interval of a scoring range of a first risk assessment scoring system and an interval of a scoring range of a second risk assessment scoring system. A proposed rule is tested by determining if its performance falls within a defined range of the performance criteria when applied to data for previous transactions. If application of the rule satisfies the performance criteria, then the rule is accepted as part of the rule base for that tier or category of clients.

21 Claims, 5 Drawing Sheets

(56) References Cited

U.S. PATENT DOCUMENTS

| | | | |
|---|---|---|---|
| 2002/0194119 A1* | 12/2002 | Wright et al. | 705/38 |
| 2003/0167226 A1* | 9/2003 | Britton et al. | 705/38 |
| 2003/0220860 A1 | 11/2003 | Heytens et al. | |
| 2006/0226216 A1 | 10/2006 | Keithley et al. | |
| 2007/0106582 A1 | 5/2007 | Baker et al. | |
| 2007/0246528 A1 | 10/2007 | Kubo et al. | |
| 2008/0046334 A1 | 2/2008 | Lee et al. | |
| 2008/0077515 A1 | 3/2008 | Zoldi et al. | |
| 2008/0275829 A1 | 11/2008 | Stull et al. | |

OTHER PUBLICATIONS

US Fed News Service; "Texas Inventors Develop Financial Transaction Risk Assessment System"; US State News; Jul. 19, 2008.*

International Search Report and Written Opinion mailed Dec. 22, 2010 in PCT Application No. PCT/US2010/035936, filed May 24, 2010 (10 pages).

* cited by examiner

PAYMENT TRANSACTION AUTHORIZATION RULES

First Scoring System Scoring System Interval(s)

| Second Scoring System Scoring System Interval(s) | 0-34 | 35-39 | 40-49 | 50-59 | 60-64 | 65-69 | 70-74 | 75-79 | 80-84 | 85-89 | 90-94 | 95-99 |
|---|---|---|---|---|---|---|---|---|---|---|---|---|
| 950-999 | 402 | | | | | | | | | | | |
| 900-949 | | | | | | | | | | | | |
| 850-899 | | | | | | | | | | | | |
| 800-849 | | | | | | | | | | | | |
| 750-799 | | | | | | | | | | | | |
| 700-749 | | | | | | | | | | | | |
| 650-699 | | | | | | | | | 404 | | | |
| 600-649 | | | | | | | | | | | | |
| 500-599 | | | | | | | | | | | | |
| 400-499 | | | | | | | | | | | | |
| 0-399 | | | | | | | | | | | | |

Figure 4

MANAGED REAL-TIME TRANSACTION FRAUD ANALYSIS AND DECISIONING

CROSS REFERENCE TO RELATED APPLICATIONS

This application claims priority from U.S. Provisional Patent Application No. 61/182,019, entitled "Managed Real-Time Transaction Processing," filed May 28, 2009, the contents of which is hereby incorporated in its entirety by reference for all purposes.

BACKGROUND

Embodiments of the present invention are directed to systems, apparatuses and methods for processing payment transaction data, and more specifically, to the real-time processing of transactions as part of a transaction authorization process. Embodiments of the invention utilize a set of transaction decline rules to identify potentially fraudulent or otherwise undesirable transactions and to assist in deciding whether to authorize (approve) or decline a transaction. Embodiments of the invention may be used for multiple types of transactions, including, but not limited to, electronic or E-Commerce payment transactions, ATM (automated teller machine) transactions, money transfer transactions, etc. Further, embodiments of the invention may be used to generate a set of customized rules for a client or institution based on a common set of transaction processing rules that are applied to a group of clients or institutions. In some embodiments, the customized set of rules may be obtained by selecting a set of rules to be used for evaluating transactions and determining if those rules produce results that fall within a desired range of false positive ratio values for the client when applied to previously processed transactions. Embodiments of the invention may be used both as part of a transaction authorization process for proposed transactions and as part of a fraud analysis performed on completed transactions.

Consumer payment devices such as debit cards or credit cards are used by millions of people worldwide to facilitate various types of commercial transactions. In a typical transaction involving the purchase of a product or service at a merchant location, the payment device is presented at a point of sale terminal ("POS terminal") located at a merchant's place of business. A consumer may also initiate a transaction by providing payment data from a remote location to a merchant over a network such as the Internet. Transactions of this type are typically initiated using a computing device such as a personal computer or laptop computer. Transactions may also be initiated by using a mobile device such as a cell phone or personal data assistant (PDA) that communicates with a merchant or service provider directly or indirectly over a wireless network.

Given the large number of transactions and amounts of money involved, the detection and prevention of fraud is an important consideration of any transaction processing system. In order to address this problem, payment processors and others involved in authorizing a transaction have developed data analysis tools designed to identify fraudulent behavior within an individual account and over a set of transactions as a whole. These tools are used as a form of transaction risk analysis to provide an Issuer with an estimate or indicator of the risk associated with a specific transaction. This allows the Issuer to consider the risk involved prior to authorizing the transaction. If the risk analysis indicates an unacceptable level of risk for a particular transaction, then the Issuer can refuse or deny the transaction. This prevents the consumer from being able to complete the transaction with a merchant. Typically, the risk analysis is implemented in the form of rules, where if a transaction satisfies the conditions of a rule, it is considered to be a fraudulent transaction (or at least one deserving of further scrutiny, such as conditioning the completion of the transaction on satisfaction of an additional requirement).

Although present forms of risk analysis provide a benefit to the parties involved in transactions, such transaction data processing tools do have disadvantages, particularly in terms of their use for real-time processing of transactions. It is desirable to provide a real-time transaction processing capability for a relatively large group of clients (e.g., merchants or service providers), as a way of identifying potentially fraudulent transactions before they are completed. This requires that decisions on whether to approve or decline a transaction need to be made relatively quickly in order to prevent a backlog of transactions and to maintain a positive user experience. However, because each client has their own specific way of operating their business or providing services, they may identify a fraudulent transaction based on conditions, variables or characteristics that are unique to their business. This means that in order to be most effective, each client may desire that transactions with that client be subject to its own set of transaction authorization or decline rules that are customized to its business.

However, this goal may not be practical as transaction processing systems typically have a rule base that is fixed in size to optimize the use of the data processing and data storage resources. Thus, for a large set of clients, a customized rule base may not be practical to implement and may require excessive data processing resources to utilize. Another problem with implementing a customized rule base is that of managing the rule base as it grows in size or as the number of clients increases. It is important to maintain only those rules in the rule base that produce a desired level of performance in order to optimize the use of processing resources and data storage capacity. This can become a significant logistics problem when managing a customized rule base for a large number of clients. Therefore, it would be desirable to be able to implement real-time processing of transactions using a common or partially common rule base for an entire set of clients, where that rule base is able to provide a level of customization for each client that is acceptable to that client.

What is desired is a system, apparatus and method for providing real-time payment transaction authorization processing for a large set of clients using a common or partially common rule base. It is also desired to have an effective method of managing the rule base based on performance criteria that produce satisfactory results for each of the set of clients. It is also desired to have an efficient and effective process for identifying fraud in previously completed payment transactions. Embodiments of the invention address these problems and other problems individually and collectively.

SUMMARY

Embodiments of the present invention are directed to a system, apparatus, and method for providing real-time or pseudo real-time processing of payment transactions for a large set of clients as part of a transaction authorization process, using a common or partially common rule base. Each client may be assigned to a tier or category, with the tier or category defined by specified performance criteria. In some embodiments, the specified performance criteria include a false positive ratio (FPR). In some embodiments, the invention uses two risk scoring systems to provide an evaluation of the potential risk of a transaction, typically as part of a transaction authorization process. Each risk scoring system is defined by a range of a numerical or other value (such as a letter or character), with the range partitioned or sub-divided into multiple intervals. In some embodiments, a transaction authorization rule is defined as a combination of an interval or intervals of the range of the first risk scoring system and an interval or intervals of the range of the second risk scoring system. A proposed rule is tested by determining if its performance (that is its identification of fraudulent or otherwise undesirable transactions) falls within a defined range of the performance criteria. If application of the rule satisfies the performance criteria, then the rule is accepted as part of the rule base for that tier or category of clients. The rule base for a tier or category may be dynamically managed by an on-going evaluation of the performance of the rules contained in the rule base. Embodiments of the invention may be used for multiple types of transactions, including, but not limited to, E-Commerce or electronic payment transactions, ATM (automated teller machine) transactions, money transfer transactions, etc.

Embodiments of the invention may be used both as part of a transaction authorization process for proposed transactions and as part of a fraud analysis performed on completed transactions. For example, a proposed rule may be used to identify a previously completed transaction as being suspect or otherwise deserving of scrutiny, resulting in the creation of a "case" that will be subject to further investigation. The investigation will typically include contacting the consumer involved in the transaction to determine if the transaction was actually fraudulent. The results of the investigation (a confirmation of whether the suspect transaction was fraudulent or not) can be reviewed and analyzed to evaluate the performance of the proposed rule, with this evaluation being based on application of the proposed rule to multiple such "cases" or "investigations". Evaluation of the operation of the proposed rule may include generation of an evaluation metric, such as the false positive ratio (FPR), where the FPR may be defined as the ratio of the number of cases that are confirmed as not being fraudulent divided by the number of cases confirmed as being fraudulent (as a result of the investigation and contact with the consumer). A rule that demonstrates a FPR within a specified range may then be adopted for use in processing transactions for a client having a certain risk profile or business model, where the transactions processed may include both proposed transactions (as in an authorization process) and previously conducted transactions (as part of identifying potentially fraudulent transactions).

In one embodiment, the present invention is directed to an apparatus for processing a payment transaction, where the apparatus includes a processor configured to execute a set of instructions, a memory coupled to the processor for storing the set of instructions, and the set of instructions stored in the memory, wherein when executed by the processor the instructions implement a process to generate a rule for use in determining if authorization should be declined for the payment transaction, wherein the process of generating the rule further comprises selecting a plurality of payment transaction risk assessment models, each risk assessment model producing a score indicative of the likelihood of a transaction being fraudulent, for each risk assessment model, dividing a range of the score into multiple intervals, and generating the rule by combining an interval of the range of a first risk assessment model with an interval of the range of a second risk assessment model, and apply the rule to the payment transaction to determine if authorization for the transaction should be declined.

In another embodiment, the present invention is directed to a method of processing a payment transaction, where the method includes generating a rule for use in determining if authorization should be declined for the payment transaction, wherein the process of generating the rule further comprises selecting a plurality of payment transaction risk assessment models, each risk assessment model producing a score indicative of the likelihood of a transaction being fraudulent, for each risk assessment model, dividing a range of the score into multiple intervals, and generating the rule by combining an interval of the range of a first risk assessment model with an interval of the range of a second risk assessment model, and applying the rule to the payment transaction to determine if authorization for the transaction should be declined.

In yet another embodiment, the present invention is directed to a method of generating a rule base for determining whether to authorize a payment transaction, where the method includes selecting a plurality of payment transaction risk assessment scoring models, wherein each scoring model produces a value indicative of the risk associated with a transaction, the value falling within a range of values, for each scoring model, dividing the range of values into a plurality of intervals, wherein each interval represents a sub-range of the range of values, generating a proposed rule by selecting a combination of an interval of the range of a first scoring model and an interval of the range of a second scoring model, evaluating the performance of the proposed rule by applying the rule to data for previously completed transactions, and including the rule in the rule base if the performance of the rule meets or exceeds a specified criteria.

In yet another embodiment, the present invention is directed to an apparatus for identifying payment transactions that should be considered as potentially fraudulent, where the apparatus includes a processor configured to execute a set of instructions, a memory coupled to the processor for storing the set of instructions, and the set of instructions stored in the memory, wherein when executed by the processor the instructions implement a process to generate a rule for identifying potentially fraudulent payment transactions, wherein generating the rule further comprises selecting a plurality of payment transaction risk assessment models, each risk assessment model producing a score indicative of the likelihood of a transaction being fraudulent, for each risk assessment model, dividing a range of the score into multiple intervals, and generating the rule by combining an interval of the range of a first risk assessment model with an interval of the range of a second risk assessment model, access transaction data for a plurality of payment transactions, apply the generated rule to the transaction data for each of the plurality of payment transactions, identify a payment transaction that is one of the plurality of payment transactions as potentially fraudulent if the transaction data for that payment transaction satisfies the generated rule, and create a fraud case file for each payment transaction identified as being potentially fraudulent.

Other objects and advantages of embodiments of the present invention will be apparent to one of ordinary skill in the art upon review of the detailed description of the present invention and the included figures.

BRIEF DESCRIPTION OF THE DRAWINGS

FIG. 4 is a chart illustrating a possible set of rules suitable for use in implementing real-time or pseudo real-time processing of transactions, in accordance with some embodiments of the present invention.

DETAILED DESCRIPTION

Figure 1:
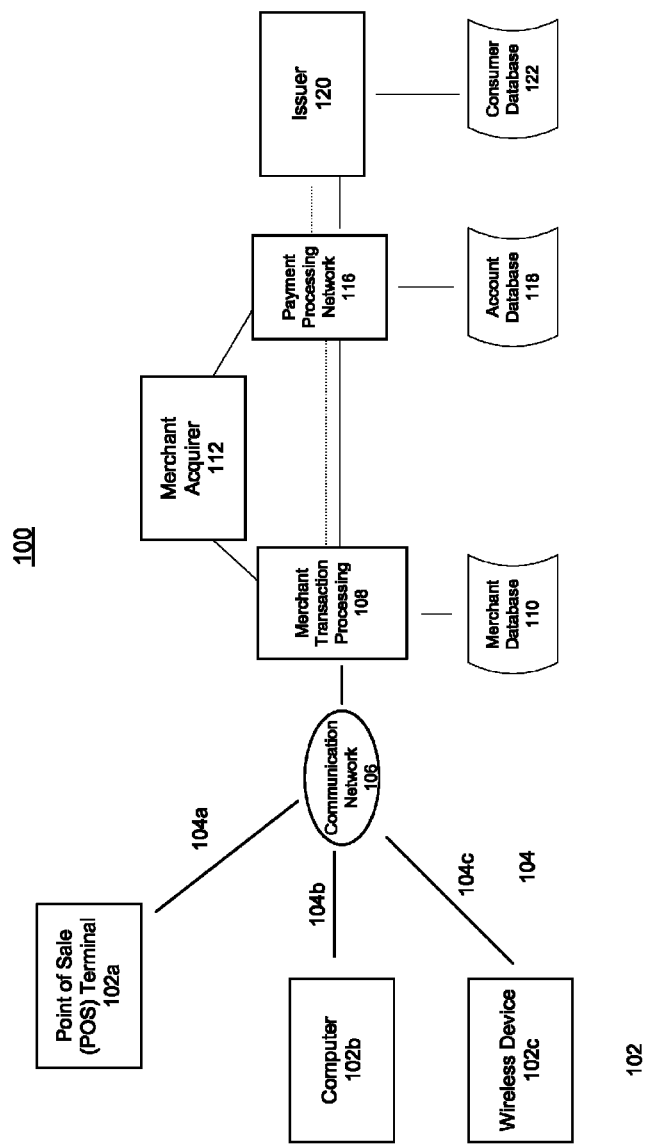
FIG. 1 is a functional block diagram illustrating the primary functional elements of an exemplary system for authorizing an electronic payment transaction that may be used with some embodiments of the present invention.

Embodiments of the present invention are directed to a system, apparatus, and method for providing real-time or pseudo real-time processing of payment transactions for a large set of clients as part of a transaction authorization process, using a common or partially common rule base. Each client is assigned to a tier or category with the tier or category defined by specified performance criteria, which may be selected based on the client's risk profile or business model. In some embodiments, the specified performance criteria includes a false positive ratio (FPR), which may be defined as the ratio of the number of cases that are confirmed as not being fraudulent divided by the number of cases confirmed as being fraudulent (as a result of investigation and contact with the consumer), where a "case" represents a previous transaction that was identified as being potentially fraudulent based on application of a proposed rule in the rule base. Embodiments of the invention may be used both as part of a transaction authorization process for proposed transactions and as part of a fraud analysis performed on completed transactions.

In some embodiments, the invention uses two risk scoring systems to provide an evaluation of the potential risk of a transaction as part of a transaction authorization process. Each risk scoring system is defined by a range of a numerical or other value (such as a letter or other character), with the range partitioned or sub-divided into multiple intervals. For purposes of transaction processing a rule is used to decide whether to decline or approve a transaction, where if the transaction satisfies a rule, it is declined. In some embodiments, a rule is defined as a combination of an interval or intervals of the range of the first risk scoring system and an interval or intervals of the range of the second risk scoring system. A proposed rule is tested by determining if its performance (that is its identification of fraudulent or otherwise undesirable transactions) falls within a defined range of the performance criteria when the proposed rule is applied to data for previous transactions. If application of the rule satisfies the performance criteria, then the rule is accepted as part of the rule base for that tier or category of clients.

The rule base for a tier or category may be dynamically managed by on-going evaluation of the performance of the rules contained in the rule base. In this way a set of rules applied to the transactions generated by a group of clients may be continually updated and refined to maintain a desired level of performance in detecting and preventing fraudulent or otherwise undesirable transactions. By generating and testing proposed rules, a common rule base may be developed for a group of clients. This provides a customized rule base that may be used in situations where the processing resources and/or data storage available would not be sufficient to provide for real time or pseudo real-time transaction processing using individualized rules for each client. Embodiments of the invention may be used for multiple types of transactions, including, but not limited to, E-Commerce or electronic payment transactions, ATM (automated teller machine) transactions, money transfer transactions, etc.

As described, in some embodiments, the present invention generates prospective rules from a combination of an interval or intervals of a range of a first risk scoring system and an interval or intervals of a range of a second risk scoring system. In this way rules based on a client's individualized operating characteristics may be replaced by rules based on standardized risk scoring systems, with the use of a plurality of risk scoring systems generally providing improved performance over the use of a single risk scoring system. The use of rules based on one or more risk scoring systems provides a scalable and efficient real time or pseudo real-time transaction processing capability that more efficiently uses processing system resources while providing a desired level of performance and customization for customers and clients (where such customers and clients typically represent Issuers, Acquirers, Merchants, banking organizations, etc., for example).

Embodiments of the present invention are typically implemented in the context of a payment transaction, and specifically, in the context of the processing of transaction data as part of a transaction authorization process. Therefore, prior to describing one or more embodiments of the invention in greater detail, a brief discussion of the entities involved in processing and authorizing a payment transaction, and their roles in the authorization process will be presented.

FIG. 1 is a functional block diagram illustrating the primary functional elements of an exemplary system 100 for authorizing an electronic payment transaction that may be used with some embodiments of the present invention. Typically, an electronic payment transaction is authorized if the consumer conducting the transaction is properly authenticated (i.e., their identity and their valid use of a payment account is verified) and has sufficient funds or credit to conduct the transaction. Conversely, if there are insufficient funds or credit in the consumer's account, or if the consumer's payment device is on a negative list (e.g., it is indicated as possibly having been stolen), then an electronic payment transaction may not be authorized. In the following description, an "Acquirer" is typically a business entity (e.g., a commercial bank) that has a business relationship with a particular merchant. An "Issuer" is typically a business entity (e.g., a bank) which issues a payment device such as a credit or debit card to a consumer. Some entities may perform both Issuer and Acquirer functions.

As shown in FIG. 1, in a typical transaction, a consumer wishing to purchase a good or service from a merchant provides transaction data that may be used as part of an authorization process, typically by means of a device 102. The consumer may utilize a payment device such as a card having a magnetic strip encoded with account data or other relevant data (e.g., a standard credit or debit card) to initiate the transaction. In an E-Commerce (electronic commerce) transaction, the consumer may enter data into a consumer device capable of communicating with a merchant or other element of system 100, such as a laptop or personal computer. The consumer may also initiate the transaction using data stored in and provided from a suitable form of data storage device (such as a smart card, mobile phone, PDA, or transportable memory device). As examples, a card or similar payment device may be presented to a point of sale terminal 102a which scans or reads data from that card. Similarly, a consumer may enter payment account data into a computing device 102b, as part of an E-Commerce transaction. Further, a consumer may enter payment account data into a cell phone or other device capable of wireless communication 102c (e.g., a laptop computer or personal digital assistant (PDA)) and have that data communicated to the transaction authorization network by the device. Wireless device 102c may also be used to initiate a payment transaction by means of communication with a merchant device reader or point of sale terminal using a near field communications (NFC) mechanism, such as RF, infra-red, optical, etc.

The payment account data (and in some cases, transaction data as well as any required consumer data) is communicated over a communication network 106 to the merchant's transaction processing system 108. The data may be provided to communication network 106 by any method or elements suitable for use with device 102. Depending on the merchant or transaction involved, communication network 106 may be the Internet, a closed network such as a corporate network, a wireless network, or other suitable form of data transport channel.

As part of the authorization process performed by the merchant, merchant transaction processing system 108 may access merchant database 110, which typically stores data regarding the consumer, the consumer's payment device, and the consumer's transaction history with the merchant. Merchant transaction processing system 108 typically communicates with Merchant Acquirer 112 (which manages the merchant's accounts) as part of the overall authorization process. Merchant transaction processing system 108 and/or Merchant Acquirer 112 provide data to Payment Processing Network 116, which among other functions, participates in the clearance and settlement processes which are part of the overall transaction processing. Communication and data transfer between Merchant transaction processing system 108 and Payment Processing Network 116 may be by means of a direct connection 114 or by means of an intermediary, such as Merchant Acquirer 112. As part of the transaction authorization process, an element of Payment Processing Network 116 may access account database 118, which typically contains information regarding the consumer's payment history, chargeback or dispute history, credit worthiness, etc. Payment Processing Network 116 communicates with Issuer 120 as part of the authorization process, where Issuer 120 is the entity that issued the payment device to the consumer and manages the consumer's account. Consumer account data is typically stored in consumer database 122 which is accessed by Issuer 120 as part of the authorization and account management processes.

In standard operation, an authorization request message is created during a consumer purchase (or proposed purchase) of a good or service at a point of sale (POS). The point of sale may be a merchant's physical location or a virtual point of sale such as a web-site that is part of an E-commerce transaction. In a typical transaction, the authorization request message is sent from the point of sale to the Merchant transaction processing system 108, then to the merchant's Acquirer 112, then to the Payment Processing Network 116, and then to an Issuer 120. An authorization request message can include a request for authorization to conduct an electronic transaction. It may include one or more of an account holder's payment account number, currency code, sale amount, merchant transaction stamp, acceptor city, acceptor state/country, etc. An authorization request message may be protected using a secure encryption method (e.g., 128-bit SSL or equivalent) in order to prevent data from being compromised.

Payment Processing Network 116 may include data processing subsystems, networks, and other means of implementing operations used to support and deliver authorization services, exception file services, and clearing and settlement services for transactions. An exemplary Payment Processing Network may include VisaNet™. Payment Processing Networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

Payment Processing Network 116 may include a server computer. A server computer is typically a powerful computer or cluster of computers. For example, the server computer can be a large mainframe, a minicomputer cluster, or a group of servers functioning as a unit. In one example, the server computer may be a database server coupled to a web server. Payment Processing Network 116 may use any suitable wired or wireless network, including the Internet to permit communication and data transfer between network elements. Among other functions, Payment Processing Network 116 may be responsible for ensuring that a user is authorized to conduct a transaction (via an authentication process), confirm the identity of a party to a transaction (via receipt of a personal identification number), confirm a sufficient balance or credit line to permit a purchase, generate a transaction risk assessment or other evaluation as part of a transaction authorization process, and reconcile the amount of purchase with the user's account (via entering a record of the transaction amount, date, etc.).

As noted, as part of processing a transaction authorization request message, a payment processor or other element of a payment processing network may perform an analysis that includes evaluating the risk associated with a proposed transaction. This evaluation may include application of one or more rules, heuristics, algorithms, models, or other forms of risk assessment to the transaction data. Such rules, heuristics, algorithms, models, or other forms of risk assessment are typically applied to data regarding the transaction (such as the type of the transaction, the amount of funds involved, the merchant involved, and the account holder wishing to participate in the transaction) to determine if the transaction is likely to be fraudulent or otherwise undesirable. If the risk assessment indicates that the transaction is likely to be fraudulent or otherwise undesirable, then the transaction may be declined.

In some embodiments of the present invention, the risk assessment is expressed as a numerical score, value, character, rating, or indicator, with a transaction being declined if the numerical score, value, character, rating, or indicator falls within a certain range, or above or below a specified threshold. Further, in some embodiments, a transaction decline rule may take the form of determining whether a risk assessment scoring method that is applied to a transaction produces a "score" that falls within a certain range, or falls above or below a specified threshold.

A set of transaction decline rules may be generated for each client or customer for application to transactions involving that client or customer. However, as the number of clients or customers increases, use of a customized rule set for each client or customer may produce a large rule base that imposes an unacceptable burden on data processing resources. Use of a customized rule set for each client or customer may also produce an unacceptable impact on transaction processing performance (i.e., processing throughput). This can lead to dissatisfaction on the part of clients or customers, and also on the part of consumers who are engaging in transactions. Thus, it is preferable to be able to generate a rule base for each client or customer that can be individually tailored to the business needs and environment of that client or customer, but which at the same time does not impose such a burden on data processing resources or performance as to create implementation problems or dissatisfaction on the part of users of the transaction processing/authorization and system.

Further, as the business needs or operating environment of a client or customer changes (due to changes in product offerings, the types or numbers of payment transactions that occur, etc.), it is desirable to be able to efficiently alter the rule base applied to transactions involving that client or customer. This may be accomplished using embodiments of the present invention by moving a client or customer to a different rule group (as defined, for example, by an acceptable false-positive-ratio), by altering the rules contained in a group, or by altering how a rule is defined or generated, for example, with such changes being designed to improve or optimize the detection of fraudulent or otherwise undesirable transactions.

Figure 2:
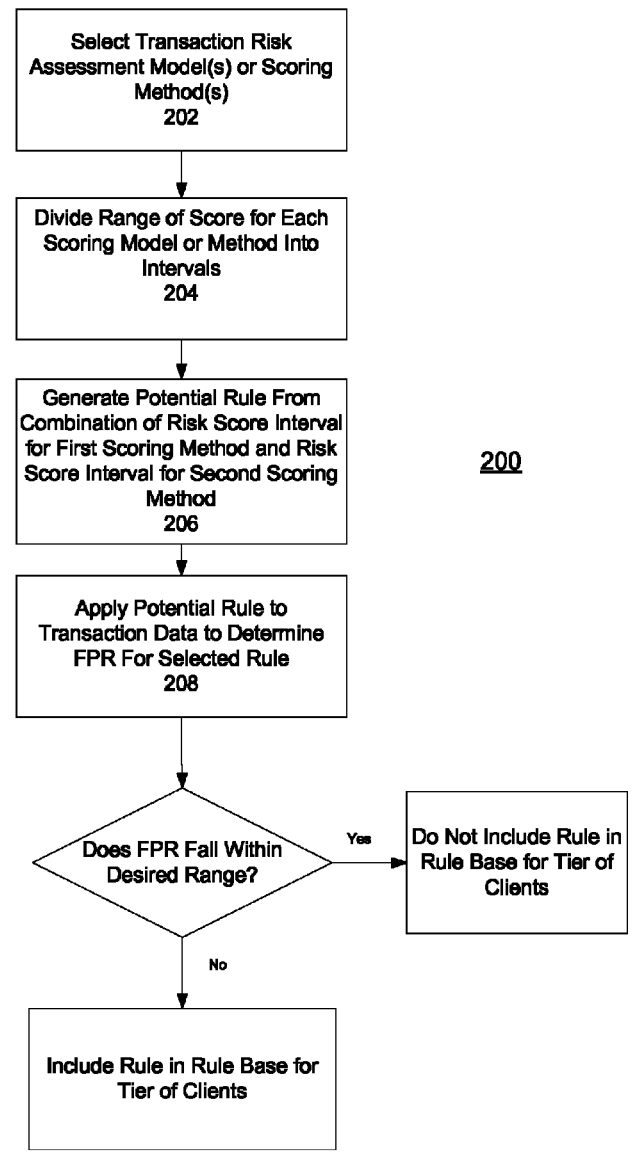
FIG. 2 is a flowchart illustrating a process for generating and evaluating a transaction decline rule for real-time or pseudo real-time processing of transactions, in accordance with some embodiments of the present invention.

FIG. 2 is a flowchart illustrating a process 200 for generating and evaluating a transaction decline rule for real-time or pseudo real-time processing of transactions, in accordance with some embodiments of the present invention. Although the process or method described with reference to FIG. 2 is typically implemented by an element of payment processing network 116 of FIG. 1 (such as a payment processor/computer that executes instructions to implement a transaction authorization process), the process or method may also be implemented by other elements of a transaction processing or authorization system. As shown in FIG. 2, a rule for use in evaluating the risk of a transaction (i.e., a measure of the likelihood that a transaction is fraudulent or otherwise undesirable) may be generated by using a risk assessment model or scoring system. At stage 202, the risk assessment model(s) or scoring system(s) to be used are selected. Although in some embodiments of the present invention, a first and a second risk assessment model or scoring system are utilized, it is to be understood that embodiments of the present invention may be implemented using a different number of such risk assessment models or scoring systems. In some embodiments, the risk assessment model or scoring system processes transaction data and generates a score, value, or indicator that represents the relative risk of the transaction. The determination of the relative risk of a transaction is typically performed as part of a transaction authorization process.

Exemplary risk assessment models or scoring systems include, but are not limited to, the Falcon transaction risk assessment system (Falcon, a product of FICO™) and the Advanced Authorization (AA, a product of Visa™) transaction risk assessment system. Other risk assessment models or scoring systems may be used in implementing embodiments of the present invention without departing from the underlying concepts of the invention. The data processing methods or techniques used to generate the transaction risk assessment or risk score may include any suitable and relevant methods, including but not limited to, heuristics, predictive algorithms, neural networks, behavior modeling, pattern matching, etc.

As noted, the transaction risk assessment model or scoring system typically provides a numerical score that represents a measure of the risk associated with a transaction, although as noted, it may also take the form of a letter, rating, or other character. The numerical score may take a value within a numerical range, with the range having an upper and a lower bound. In some embodiments, the numerical range for each risk assessment model or scoring system is partitioned or sub-divided into multiple intervals (stage 204). An interval has a lower bound and an upper bound. The numerical range generated by a risk assessment model or scoring system may be sub-divided into multiple intervals, with an increase in the number of intervals typically providing greater granularity or resolution to the risk assessment process.

Note that if the risk assessment model produces a score or rating that is not expressed as a number, then the range of the model outputs may be partitioned or sub-divided in a manner that is suited to that type of score or rating (e.g., if the model produces an output between A, B, . . . , H, where A, B, . . . H form an ordered sequence of risk values, then the range might be partitioned into intervals of (A,C), (D,E), (F,H), for example).

In some embodiments, a risk assessment rule for a potential transaction is generated by selecting a combination of an interval or intervals of one risk assessment scoring method and an interval or intervals of a second risk assessment scoring method (stage 206). For example, a transaction decline rule may be generated by combining an interval (A, . . . , B) of a first risk assessment method with an interval (a, . . . , b) of a second risk assessment method, where (A,B,a,b) represent numerical scores that serve as the lower (A, a) and upper bounds (B, b) of their respective intervals. This would produce a "rule" of the form:

If application of the first risk assessment method produces a score within the numerical range of (A, . . . , B) and application of the second risk assessment method produces a score within the numerical range of (a, . . . , b), then the transaction should be declined.

Note that typically, not all combinations of intervals are needed to generate a reasonable set of rules (e.g., it may be unproductive to combine an interval of one risk assessment model that suggests a likely fraudulent transaction with an interval of a second risk assessment model that suggests that the transaction is very unlikely to be fraudulent). Note that in applying the rules that are generated by embodiments of the present invention, the risk assessment model interval(s) may be altered and the effect of the alterations evaluated to determine if a revised set of intervals provides improved performance for a client or customer or group of clients or customers.

Thus, in accordance with the proposed rule, if the risk assessment score for the first risk model for a transaction falls within the specified interval for that risk model and the risk assessment score for the second risk model for the transaction falls within the specified interval for that risk model, then the transaction is identified as fraudulent or potentially fraudulent. In such a case, the transaction is typically declined. Note that based on the outcome of applying the rule, the transaction may instead be subjected to a challenge response (e.g., a referral process) or request for additional information as a condition for approval of the transaction.

After generation of a transaction decline rule or set of rules, the accuracy (and hence utility) of the rule or rules may be evaluated by applying the rule or rules to actual transaction data. This involves applying the rule or rules to data for previous transactions, so that the operation of the rule or rules can be determined in situations in which the correct outcome is already known (i.e., it is known whether a transaction was correctly identified as fraudulent). Thus, the potential rule is tested or evaluated by determining its performance when applied to actual transaction data (stage 208). In some embodiments, the actual transaction data may be accessed from account database 118 of FIG. 1, although such data may also be stored, wholly or partially, in merchant database 110, consumer database 122, or other suitable data storage locations.

A criterion, such as the false-positive-ratio (FPR) is selected to evaluate the performance of a rule, where the FPR may be defined as the ratio of the number of cases that are confirmed as not being fraudulent divided by the number of cases confirmed as being fraudulent (as a result of investigation and contact with the consumer), where a "case" represents a previous transaction that was identified as being potentially fraudulent based on application of a proposed rule in the rule base. Multiple criteria may also be used, such as a combination of the FPR and the improvement obtained using the proposed rule in detecting fraudulent transactions that would not have been detected without application of the rule.

In stage 208, transaction data and records from previous transactions are processed to determine how accurately the proposed rule would have identified fraudulent transactions (i.e., how accurately the rule flagged a transaction as fraudulent, based on this being confirmed by follow up investigations into the transaction to determine if it was in fact fraudulent, etc.). If the rule performed satisfactorily (such as by having a FPR value below a specified threshold or within a certain range) then the rule may be adopted and included as part of the rule base for a category or tier of clients (where that category or tier of clients desires to use a rule base that results in a certain value or range of performance). In some embodiments, rules may be grouped based on the range of FPR values that result from application of the rules to a specified set of transactions, or to a specified group of clients or customers. Clients or customers may be grouped by considering those desiring a specific range of FPR values or threshold FPR value as performance criteria, with that criteria then being used to select the rules to be applied to transactions for that client or customer. Naturally, if a rule does not perform satisfactorily, then the rule is not included as part of the rule base for that category or tier of clients. Note that other suitable criteria, aside from or in addition to, FPR may be used to define the tiers or categories of clients and as noted, to evaluate the performance of a proposed rule.

A client or customer operates their business in a dynamic environment in which product offerings, the user base, product or service delivery methods, financing methods, etc., all may change over time. As a result, the types of fraudulent transactions or the characteristics of fraudulent transactions are also expected to change over time. In addition, as a business evolves or adapts to a changing business environment, its risk profile or tolerance may also change. Thus, over time the performance criteria and/or set of transaction decline rules that a client or customer desires to have applied to its transactions may change. This means that an effective transaction decline rule base for a client or customer is one that is capable of being managed in a way that allows for changing performance criteria and/or rule characteristics, such as by altering the risk assessment scoring intervals that are part of a rule, the size of the intervals, etc. Further, in order to effectively manage a rule base for a large number of clients or customers, the rule base management method should be efficient in terms of data processing resource usage, etc.

Figure 3:
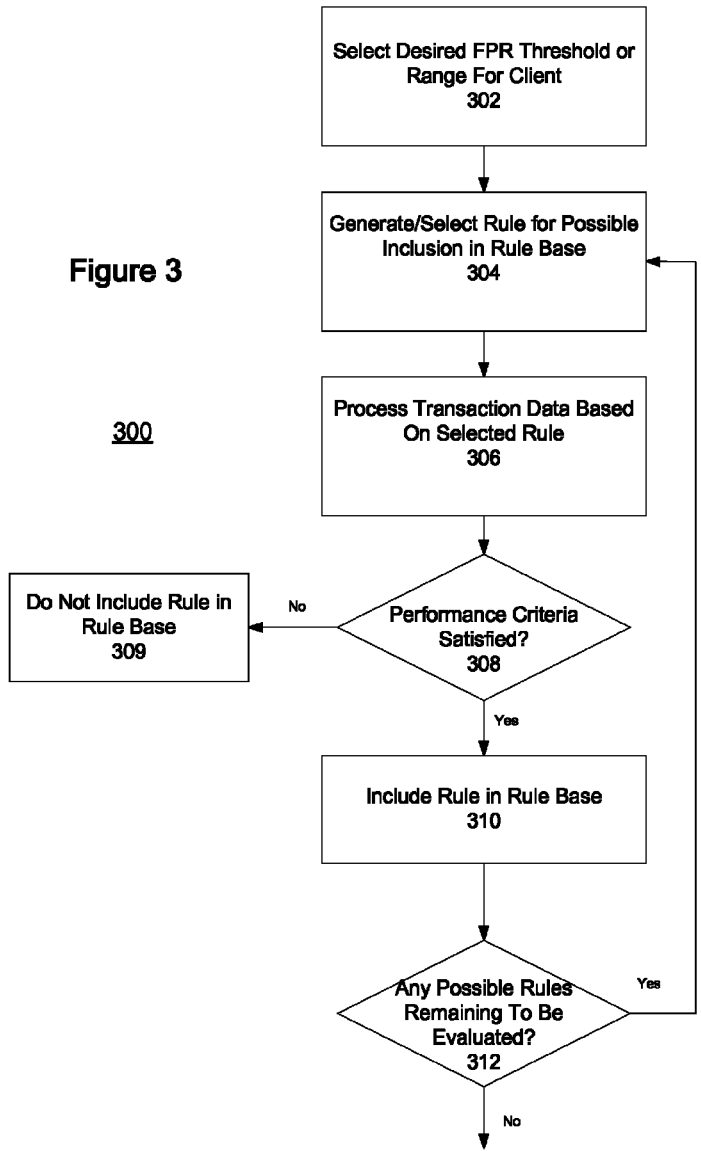
FIG. 3 is a flowchart illustrating a process for managing a rule base for a client as part of implementing real-time or pseudo real-time processing of transactions, in accordance with some embodiments of the present invention.

FIG. 3 is a flowchart illustrating a process 300 for managing a rule base for a client as part of implementing real-time or pseudo real-time processing of transactions, in accordance with some embodiments of the present invention. Although the process or method described with reference to FIG. 3 is typically implemented by an element of payment processing network 116 of FIG. 1, the process or method may also be implemented by other elements of a transaction processing or authorization system (such as a data processing or computing element involved in a transaction authorization process). As shown FIG. 3, a rule base includes a set of rules used to evaluate transactions for a client or set of clients, typically as part of a transaction authorization process. As part of the rule base management process, the client or group of clients are identified as having a common FPR range or threshold, that is, they have a common threshold value or range of values for the performance criteria used to evaluate the accuracy or effectiveness of the rules in the rule base (stage 302). In this sense, the client or group of clients have a similar risk profile or tolerance. Any proposed rule must operate so as to have the desired performance criteria value or range of values in order to be applied to future transactions processed for a client in that group.

Thus, in order to manage the rule base for a client, a desired range or threshold value for the performance criteria (e.g., the FPR) is selected (stage 302). A proposed rule is then generated/selected (stage 304) and evaluated by processing previous transaction data (stage 306). If application of the proposed rule (to data for previous transactions for that client or for other clients) results in satisfying the desired value or values of the performance criteria, then the proposed rule is included (or maintained) in the rule base for that client and for the group of clients having the same desired performance criteria value or values (stages 308 and 310). If application of the proposed rule does not result in satisfying the desired value or values of the performance criteria, then the proposed rule is not included in the rule base for that client and for the group of clients having the same desired performance criteria value or values (stage 309). Next, the process checks if there are any other potential rules that require evaluation at that time for the client or group of clients (stage 312). If there are other rules that require evaluation, then control is returned to stage 304 where another rule is selected and evaluated. In this way the rule base for a client or group of clients may be dynamically managed by adding or removing rules as the rule or rules demonstrate their effectiveness in meeting the desired performance criteria. Note that the rules included in a rule base for a client or group of clients may change as the performance criteria change for that client or group of clients. This may occur, for example, if the risk tolerance or business goals of the client change so that the client is now willing to accept a different range of FPR values for the processing of transactions for that client. Further, the performance of a rule may change based on changes to the structure of the rule, such as due to changes to the risk assessment scoring method used, the definition of the risk scoring intervals, etc.

FIG. 4 is a chart or table illustrating a possible set of rules suitable for use in implementing real-time or pseudo real-time processing of transactions, in accordance with some embodiments of the present invention. The data structure from which the chart or table of Figure may be derived would typically be stored in a database accessible by an element of payment processing network 116 of FIG. 1, although it may of course be stored in other suitable data storage elements. The chart or table of FIG. 4 depicts a two-dimensional rules matrix formed from application of two risk assessment scoring methods to the transactions. As shown in the figure, the exemplary set of rules are generated from selecting an interval or intervals of a first and a second risk scoring system or methodology, for example the Advanced Authorization (VAA) system and the Falcon system. Each system or methodology expresses its risk assessment for a transaction as a numerical score. In the example shown, application of the first scoring system to a transaction produces a risk assessment score in a range from 0 to 99. Application of the second scoring system to a transaction produces a risk assessment score in the range from 0 to 999.

As shown in the figure, the respective scoring ranges for each system are partitioned or sub-divided into multiple intervals (e.g., 35-39, 40-49, etc. for the first scoring system, and 400-499, 500-599, etc. for the second scoring system). Note that the partitioning or sub-dividing of the scoring system ranges depicted in the figure are only exemplary, as other numbers of intervals or other bounds on the intervals may be selected for use in generating and evaluating a possible rule.

A proposed rule is then generated from a combination of one or more intervals of the first risk scoring system and one or more intervals of the second risk scoring system. Example or proposed rules are depicted in the figure by the bold lines drawn around a set of interval values. For example, the box labeled 402 in the figure represents a rule formed from the intervals 0-34, 35-39, and 40-49 (or 0-49) of the first risk scoring system and the intervals 900-949 and 950-999 (or 900-999) of the second risk scoring system. Thus, for the example rule depicted as box 402 in the figure, a transaction would be declined if application of the two risk scoring systems produced a risk assessment score that fell within the range of 0-49 for the first system and also fell within the range of 900-999 for the second system. Similarly, box 404 depicts a transaction risk assessment rule formed from the range of 75-84 of the first risk scoring system and the range of 0-399 of the second risk scoring system.

Note that the rules depicted in FIG. 4 are only exemplary, as other combinations of risk assessment scoring system intervals are possible for use as a transaction authorization rule that may be part of a transaction decision process. Further, for some cases, additional rules may be formulated that only take into account one of the risk scoring systems, or are based on both risk scoring systems but are partially or wholly independent of the value produced by one of the systems. Note that a different number of risk scoring systems or methods may also be used, with a proposed rule being formed by combining an interval or intervals of each such scoring system. As mentioned, embodiments of the invention may be used to decide whether to authorize or place conditions on the authorization of a proposed payment transaction. In addition, embodiments of the invention may be used to analyze transaction data for previous transactions as part of a fraud analysis intended to identify suspect transactions and provide information for investigating those transactions. When used as part of a fraud analysis that is applied to suspect transactions, embodiments of the invention may be used to generate potential fraud case creation rules and then to test the effectiveness of those rules by measuring the performance of those rules after an investigation into the suspect transactions.

As described, FIG. 4 depicts a matrix formed from combining ranges or intervals of two risk scoring systems or methods. A transaction risk assessment rule is generated by selecting an interval or intervals of the first risk scoring method and an interval or intervals of the second risk scoring method. The proposed rule is then tested to determine if it performs in an acceptable manner when applied to actual transaction data. If the proposed rule produces acceptable results, it may be included in a rule base for a client or set of clients that have a common desired performance criteria, such as a common range of acceptable values for a false-positive-ratio. Thus, only rules that produce results that fall within the range of desired performance criteria of a client or group of clients are included in a rule base for that client or clients.

From another perspective, the process may be described as one in which a rule is generated and tested against actual transaction data to determine its performance, expressed as a FPR or other suitable measure. Rules are grouped according to a range of their performance measure (e.g., a range of FPR, etc.), with the rules in the group producing results in a range of the performance measure (e.g., a FPR of 1.5 to 2.0). A client or customer is associated with a set of rules having a common range of the performance measure based on the client's risk tolerance, business goals, acceptable error rate, etc. For example, a client may wish to operate with a set of transaction decline rules that produce a relatively low ratio (FPR) of false positives to actual fraudulent transactions (e.g., below 2:1 for a defined time interval, for relatively conservative clients wishing to minimize the impact on consumers). Similarly, a client may wish to have its transactions evaluated using a set of rules that is more likely to err on the side of identifying a transaction as fraudulent, even if that means imposing a greater burden on consumers (e.g., a FPR below 3:1). The set of rules in the selected group are then applied to future transactions for that client. The rules in the group (and other possible rules) may be evaluated or re-evaluated on a regular basis to determine if they produce results that satisfy a client's performance criteria requirements. For example, the rules in a rule base applied to a specific client may be evaluated every month to determine if they continue to generate a performance measure within the desired range or above or below a specified threshold value. Further, as the client's performance criteria requirements change, the rules applied to the client's transactions can be changed as well.

A client or clients may be moved to a different group or tier of customers based on the desired performance or risk tolerance of that client or clients, with the rule or rules that satisfy that performance criteria being applied to clients in that group or tier. Note that just as a client or clients may be moved to different performance criteria tiers, rules may produce a different outcome in terms of reliability or performance criteria depending upon the technique or method applied to generate the risk score, the transaction characteristics, etc. Thus, a rule that has generated results that satisfy a specified value or range of values for a performance criteria at one time may not do so at a later time.

Generation of rules for a fraud analysis, transaction risk assessment or transaction authorization rule base in the manner described herein may provide a more optimal use of transaction processing resources than use of individualized rules based on each client's specific operating characteristics. Embodiments of the inventive transaction authorization method and rule base may be used to effectively address resource constraints (e.g., rule base data storage, computational limitations imposed by a desired through put of authorization decisions, etc.) while providing real time or pseudo real-time processing of transactions and maintaining a desired quality of service and customization for customers and clients. A client may be placed into a category or tier based on the client's business objectives, risk tolerance, etc., with a client in a specified tier being subjected to a set of transaction decline rules that produce a specified performance (as expressed by a range or threshold value of a performance criteria).

As described, embodiments of the present invention use one or more transaction risk assessment methods or systems to generate proposed transaction decline rules, where such rules may be used as part of a fraud analysis or transaction authorization process. The transaction risk assessment methods or systems may utilize one or more suitable processes to provide an assessment of the risk associated with a transaction, where such processes may include neural networks, decision models, predictive behavior models, collaborative filtering models, heuristics based on transaction patterns, etc.

In particular, the use of two or more risk assessment methods or systems can provide more effective detection of transaction risk than standard fraudulent transaction pattern matching approaches, which seek to identify a proposed transaction as a risk based on whether its characteristics match a previously defined pattern that suggests fraud. Further, as described, the effectiveness of a proposed rule that is generated using embodiments of the present invention can be tested by determining how accurately it detects fraudulent transactions for a set of previous transactions, for which the outcome of a fraud investigation is already known.

Embodiments of the present invention may be used alone or in combination with other fraud detection, transaction authorization, or risk assessment methods or systems. For example, a combination of a score based method and pattern matching based on fraudulent transaction trends, or a score based method and identification of a specific indicator or transaction characteristic might be used to provide a desired level of accuracy in detecting fraudulent transactions. Further, by sub-dividing a range of one or more risk assessment methods or systems into multiple intervals, a relatively large number of possible transaction decline rules can be generated from a relatively small number of actual risk assessment methods or systems.

Figure 5:
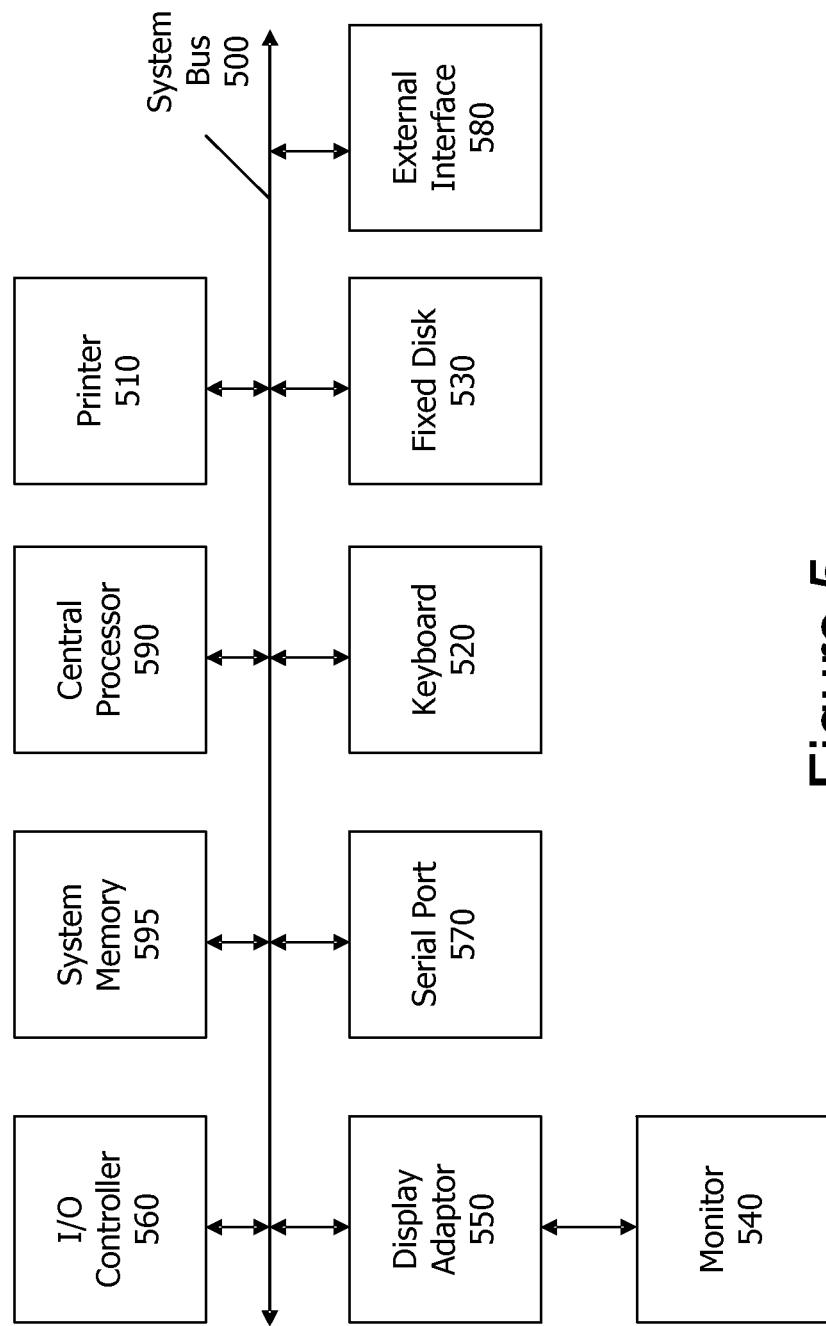
FIG. 5 is a block diagram of elements that may be present in a computer device or system configured to execute a method or process for implementing real-time or pseudo real-time processing of transactions, in accordance with some embodiments of the invention.

In some embodiments, the inventive methods, processes or operations for providing real-time or pseudo real-time processing of transactions may be wholly or partially implemented in the form of a set of instructions executed by a central processing unit (CPU), microprocessor, or other computing apparatus. The CPU, microprocessor, or other computing apparatus may be incorporated in an apparatus, server or other computing device operated by, or in communication with, a node of the transaction authorization network. As an example, FIG. 5 is a block diagram of elements that may be present in a computer device or system configured to execute a method or process for implementing real-time or pseudo real-time processing of transactions, in accordance with some embodiments of the invention. The subsystems shown in FIG. 5 are interconnected via a system bus 500. Additional subsystems such as a printer 510, a keyboard 520, a fixed disk 530, a monitor 540, which is coupled to a display adapter 550, and others are shown. Peripherals and input/output (I/O) devices, which couple to an I/O controller 560, can be connected to the computer system by any number of means known in the art, such as a serial port 570. For example, the serial port 570 or an external interface 580 can be used to connect the computer apparatus to a wide area network such as the Internet, a mouse input device, or a scanner. The interconnection via the system bus 500 allows a central processor 590 to communicate with each subsystem and to control the execution of instructions that may be stored in a system memory 595 or the fixed disk 530, as well as the exchange of information between subsystems. The system memory 595 and/or the fixed disk 530 may embody a computer readable medium.

It should be understood that the embodiments of the present invention described above can be implemented in the form of control logic using computer software in a modular or integrated manner. Based on the disclosure and teachings provided herein, a person of ordinary skill in the art will know and appreciate other ways and/or methods to implement embodiments of the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. An apparatus for processing payment transactions for one or more institutions assigned to a category, comprising:
   a processor configured to execute a set of instructions;
   a memory coupled to the processor for storing the set of instructions; and
   the set of instructions stored in the memory, wherein when executed by the processor the instructions cause the apparatus to
   obtain a performance criteria for the category, the performance criteria being at least in part indicative of a risk tolerance of the one or more institutions assigned to the category;
   generate a rule for the category, the rule used to determine if authorization of a payment transaction should be approved or declined, wherein generating the rule further comprises
      selecting a first and a second payment transaction risk assessment model, each risk assessment model producing a score within a range of possible scores, the score indicative of the likelihood of a transaction being fraudulent;
      for each risk assessment model, dividing the range of possible scores into a plurality of intervals, each interval representing a portion of the range of possible scores for that model; and
      combining an interval of the range of possible scores of the first risk assessment model with an interval of the range of possible scores of the second risk assessment model, the generated rule being satisfied if application of the first risk assessment model to a payment transaction produces a score within the interval associated with the first risk assessment model and application of the second risk assessment model to the same payment transaction produces a score falling within the interval associated with the second risk assessment model; and
   apply the rule to the payment transactions to determine if authorization should be approved or declined.

2. The apparatus of claim 1, wherein the set of instructions stored in the memory further comprise instructions which when executed by the processor cause the apparatus to:
   evaluate the performance of the generated rule by applying the rule to data for previously completed transactions; and include the rule in a rule base for the category if the performance of the rule meets or exceeds the performance criteria.

3. The apparatus of claim 1, wherein the first risk assessment model is the FICO Falcon system and the second risk assessment model is the Visa Advanced Authorization system.

4. The apparatus of claim 2, wherein evaluating the performance of the generated rule further comprises determining if the generated rule satisfies the performance criteria.

5. The apparatus of claim 4, wherein the determining if the generated rule satisfies the performance criteria comprises determining if a false positive ratio falls within a specified range or below a specified threshold.

6. The apparatus of claim 4, wherein the generated rule is included in a rule base for the category if the generated rule satisfies the performance criteria.

7. The apparatus of claim 1, wherein the score is a numerical score.

8. A method of processing payment transactions for one or more institutions assigned to a category, comprising:
   obtaining a performance criteria for the category, the performance criteria being at least in part indicative of a risk tolerance of the one or more institutions assigned to the category;
   generating a rule for the category using an electronic computing device, the rule used to determine if authorization of a payment transaction should be approved or declined, wherein generating the rule further comprises
      selecting a first and a second payment transaction risk assessment model, each risk assessment model producing a score within a range of possible scores, the score indicative of the likelihood of a transaction being fraudulent;
      for each risk assessment model, dividing the range of possible scores into a plurality of intervals, each interval representing a portion of the range of possible scores for that model; and
      combining an interval of the range of possible scores of the first risk assessment model with an interval of the range of possible scores of the second risk assessment model, the generated rule being satisfied if application of the first risk assessment model to a payment transaction produces a score within the interval associated with the first risk assessment model and application of the second risk assessment model to the same payment transaction produces a score falling within the interval associated with the second risk assessment model; and
   applying the rule to the payment transactions to determine if authorization should be approved or declined.

9. The method of claim 8, further comprising:
   evaluating the performance of the generated rule by applying the rule to data for previously completed transactions; and
   including the rule in a rule base for the category if the performance of the rule meets or exceeds the performance criteria.

10. The method of claim 8, wherein the first risk assessment model is the FICO Falcon system and the second risk assessment model is the Visa Advanced Authorization system.

11. The method of claim 9, wherein evaluating the performance of the generated rule further comprises determining if the generated rule satisfies the performance criteria.

12. The method of claim 11, wherein the determining if the generated rule satisfies the performance criteria comprises determining if a false positive ratio falls within a specified range or below a specified threshold.

13. The method of claim 11, wherein the generated rule is included in a rule base for the category if the generated rule satisfies the performance criteria.

14. The method of claim 8, wherein the score is a numerical score.

15. A method of generating a rule base for determining whether to authorize a payment transaction for one or more institutions assigned to a category, comprising:
   operating an electronic computing device to perform one or more of
   obtaining a performance criteria for the category, the performance criteria being at least in part indicative of a risk tolerance of the one or more institutions assigned to the category;
   selecting a first and a second payment transaction risk assessment scoring model, wherein each scoring model produces a value indicative of the risk associated with a payment transaction, the produced value falling within a range of values;
   for each scoring model, dividing the range of values into a plurality of intervals, wherein each interval represents a sub-range of the range of values;
   generating a proposed rule for the category by selecting a combination of an interval of the range of the first scoring model and an interval of the range of the second scoring model, the generated rule being satisfied if application of the first scoring model to a payment transaction produces a score within the interval associated with the first scoring model and application of the second scoring model to the same payment transaction produces a score falling within the interval associated with the second scoring model;
   operating the electronic computing device to evaluate the performance of the proposed rule by applying the rule to data for previously completed transactions; and
   including the rule in the rule base if the performance of the rule meets or exceeds the performance criteria.

16. The method of claim 15, wherein the first risk assessment model is the FICO Falcon system and the second risk assessment model is the Visa Advanced Authorization system.

17. The method of claim 15, wherein the performance of the rule meets or exceeds the performance criteria if a false positive ratio falls within a specified range or below a specified threshold.

18. The method of claim 15, wherein the value is a numerical value.

19. An apparatus for identifying, on behalf of one or more institutions assigned to a category, payment transactions that should be considered as potentially fraudulent, comprising:
   a processor configured to execute a set of instructions;
   a memory coupled to the processor for storing the set of instructions; and
   the set of instructions stored in the memory, wherein when executed by the processor the instructions cause the apparatus to
   obtain a performance criteria for the category, the performance criteria being at least in part indicative of a risk tolerance of the one or more institutions assigned to the category;
   generate a rule for the category, the rule used for identifying potentially fraudulent payment transactions, wherein generating the rule further comprises
      selecting a first and a second payment transaction risk assessment model, each risk assessment model producing a score within a range of possible scores, the score indicative of the likelihood of a transaction being fraudulent;

for each risk assessment model, dividing the range of possible scores into a plurality of intervals, each interval representing a portion of the range of possible scores for that model; and combining an interval of the range of possible scores of the first risk assessment model with an interval of the range of possible scores of the second risk assessment model, the generated rule being satisfied if application of the first risk assessment model to a payment transaction produces a score within the interval associated with the first risk assessment model and application of the second risk assessment model to the same payment transaction produces a score falling within the interval associated with the second risk assessment model;

access transaction data for a plurality of payment transactions;

apply the generated rule to each of the plurality of payment transactions;

identify a payment transaction that is one of the plurality of payment transactions as potentially fraudulent if that payment transaction satisfies the generated rule; and create a fraud case file for each payment transaction identified as being potentially fraudulent.

20. The apparatus of claim 19, wherein the first risk assessment model is the FICO Falcon system and the second risk assessment model is the Visa Advanced Authorization system.

21. The apparatus of claim 19, wherein the score is a numerical score.

* * * * *